United States Patent [19]
Smith

[11] 3,743,222
[45] July 3, 1973

[54] VORTEX VALVE SHOCK ABSORBER

[75] Inventor: David Harold Smith, Troy, Mich.
[73] Assignee: The Boeing Company, Seattle, Wash.

[22] Filed: Feb. 17, 1972
[21] Appl. No.: 227,066

[52] U.S. Cl. ............ 244/104 FP, 188/280, 188/317
[51] Int. Cl. ............ B64c 25/60
[58] Field of Search .................. 244/104 R, 104 FP; 188/279, 280, 317, 316, 313, 311; 137/81.5

[56] References Cited

UNITED STATES PATENTS

| | | | |
|---|---|---|---|
| 2,161,811 | 6/1939 | Grebe | 188/279 |
| 3,664,360 | 5/1972 | Royle et al. | 137/81.5 |

*Primary Examiner*—Duane A. Reger
*Assistant Examiner*—Paul E. Sauberer
*Attorney*—Glenn Orlob

[57] ABSTRACT

A linear piston type, fluid damped, adaptive shock absorber for an aircraft landing gear strut having an automatically adjustable orifice through the piston. The impedance to the flow of damping fluid through the orifice is controlled by a fluidic vortex valve which utilizes small control jets of high pressure fluid injected tangentially into a circular chamber through which the main flow of hydraulic damping fluid passes. The force of fluid injected through the tangential control jets determines the strength of the swirling action of the main damping fluid flow and thereby controls the impedance to the main fluid flow through the vortex valve and the fluid chamber. The fluid pressure to the tangential control jets is automatically controlled by a servo valve which is, in turn, controlled by an automatic sensing system that determines the aircraft's vertical acceleration.

8 Claims, 3 Drawing Figures

PATENTED JUL 3 1973 3,743,222
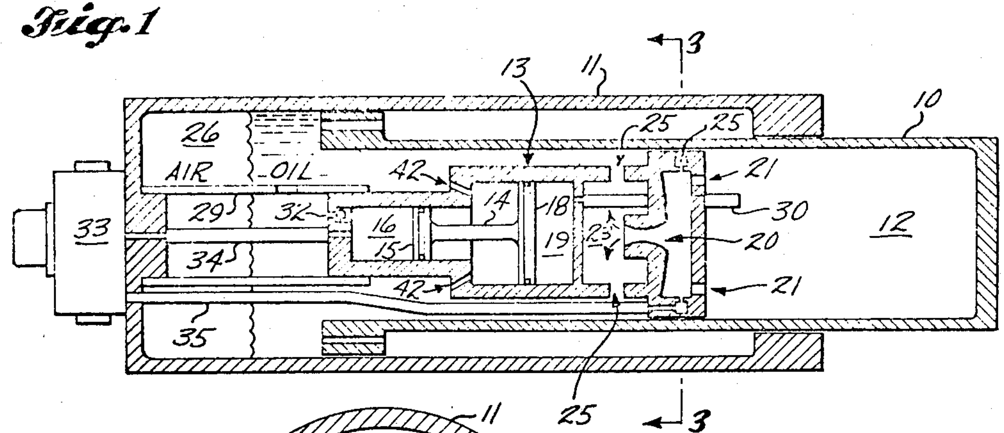
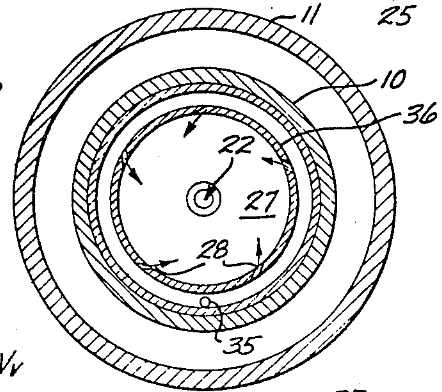
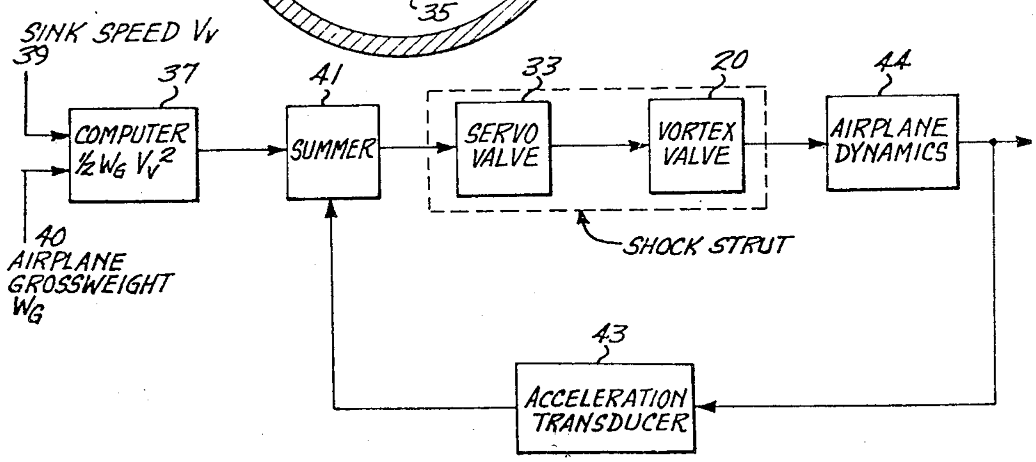

VORTEX VALVE SHOCK ABSORBER

SUMMARY OF THE INVENTION

The invention relates to a fluidic controlled vortex valve shock absorber and more particularly to an acceleration sensitive servo system that determines the vertical acceleration of an aircraft during landing touch-down and controls it to a preset value by varying the fluidic through-flow orifice impedance in the shock absorber. The variation of the through-flow orifice impedance is the direct function of an electrical servo input signal, the value of which is derived from a preselected vertical deceleration rate. The pre-selection of the deceleration rate is done by computing the vertical kinetic energy of the aircraft: by combining the gross weight, derived from the weight and balance system, with the sink speed, derived from the autopilot. The relationship between the computed kinetic energy level and servo input signal would be direct.

In a conventional aircraft shock strut, the vertical kinetic energy of an aircraft impacting the runway during landing is absorbed by a hydraulic shock absorber wherein fluid is forced through an orifice under pressure generated from the compression of the shock strut. The function of the shock strut is to spread out the impact shock over the longest possible period of time. This results in the lowest level of vertical deceleration to the airframe and therefore the minimum discomfort to the passengers and minimum loads on the structure of the aircraft. In order to achieve this low level of vertical deceleration, which is ideally of a constant level for each set of landing conditions, the velocity dependent damping rate must be continuously varied over the period of time during which the shock strut is undergoing compression. This generally necessitates a variable damping rate of the shock strut and the use of a variable area orifice which can be accomplished by moving a tapered metering pin of varying diameter into the center of the orifice, attached to the moving end of the shock strut. Thus a shock strut is produced which has a rate of vertical shock absorption distribution that varies as a function of the stroke length of the shock strut. However, this type of design will only produce the preferred or ideal type of vertical deceleration rate curve at one level of airplane landing energy, i.e., at one gross weight and sink speed. At other gross weights or sink speeds, large deceleration peaks can be generated and transmitted to the passengers and aircraft structure. When V/STOL aircraft are considered, the situation becomes aggravated since these aircraft require fairly steep landing approaches compared to conventional aircraft and they would have correspondingly higher sink speeds. The multi-operational roles of V/STOL aircraft will also tend to increase the range of landing gross weights that have to be taken into consideration. These and other factors would make the compromises that would be necessary with a pin and orifice type design unacceptable.

Therefore, one of the objects of the present invention is a landing gear shock strut mechanism that will control the rate of vertical deceleration of an aircraft as touch-down to a minimum level over a wider range of landing gross weights and sink speeds than prior known shock absorbers utilizing a pin and orifice type design.

Another object of the present invention is to generate the necessary high pressure control flow for vortex valve operation by a self-contained pressure multiplier housed within the shock absorber and actuated by compression of the landing gear shock strut during touch-down. The landing gear and its shock absorber operation is thereby not compromised by the fallibility of the airplane hydraulic system as a source of fluid pressure supply. Also, the multiplier automatically resets itself when the landing gear strut extends upon take-off.

One of the advantages of the present invention is that the vortex valve response to the high pressure control flow signals from the automatically controlled servo valve is very rapid and this characteristic is essential to the adequate function of the landing gear shock strut.

Another advantage of the vortex valve controlled shock strut is its mechanical simplicity relative to the complication of its function, since there is only one moving part, the differential piston assembly, involved in the impedance control in the shock strut proper.

A further advantage of the present invention is its ideal suitability to the suspension system of high speed ground vehicles including air cushion supported trains.

BRIEF DESCRIPTION OF THE DRAWINGS

FIG. 1 is a functional and schematic illustration in axial cross section of a shock absorber mechanism embodying the variable impedance assembly of the invention.

FIG. 2 is a sectional view of the vortex valve taken in the direction indicated by 3—3 of FIG. 1.

FIG. 3 is a block diagram showing the components of the automatic sensing system for varying the input signal to the electrical servo controlled vortex valve.

DESCRIPTION OF THE PREFERRED EMBODIMENTS

The invention relates to a fluidic vortex valve shock absorber and an automatic sensing device for varying the damping characteristics through the method of varying the through-flow orifice impedance as a function of an electrical servo input signal.

With reference to the figures, FIGS. 1 and 2 show the fluidic vortex valve shock absorber of the present invention which will be described with respect to the preferred embodiment of the invention in an aircraft shock strut that functions to control the vertical deceleration rate during landing touch-down for a wide range of aircraft gross weights and sink speeds. As the aircraft touches down and the wheels contact the runway, the inner cylinder 10 is pushed into the outer cylinder 11 of the landing gear strut and compresses the fluid in chamber 12. The fluid in chamber 12 being trapped between the interior of the cylinder 10 and the fixed piston-like variable impedance assembly 13. The variable impedance assembly comprises: a differential piston 14 having a high pressure piston head 15 axially moving in chamber 16 and a low pressure piston head 18 axially moving in chamber 19; and the fluidic vortex valve 20. The vortex valve 20 functions as a variable impedance device and replaces the pin and orifice arrangement of a conventional shock absorber. The control of the variation of the orifice impedance is effected by controlling the swirling action in the vortex valve of the main through-flow of fluid from chamber 12, through an annular series of ports 21 and out of the central exit 22 of the vortex valve into chamber 23. From there, the fluid flows through openings 25 and into chamber 26 of the outer cylinder 11. Control of the swirling action of the main through-flow, is accomplished by supplying a controlled pressure fluid flow into the vortex valve chamber 27 through tangential control jets 28. The controlled pressure flow to the tangential control jets 28 has to be supplied at a higher pressure than the normal pressure developed through compression of the shock strut. The method for obtaining this supply of high pressure fluid is through the means of the free axially movable differential piston 14 situated in the variable impedance assembly 13. The assembly 13 is fixedly attached to the outer cylinder 11 by a perforated sleeve 29. As the shock absorber is compressed, the higher pressure fluid in chamber 12 passes through the tube 30 and enters the differential piston chamber 19 where it acts against the larger piston head 18 of the differential piston 14 thereby axially moving the smaller piston head 15 and pressurizing the fluid in chamber 16. The one-way ball check valve 32 functions to block the flow exiting from chamber 16. The pressurized fluid from chamber 16 is directed to the servo valve 33 through the interconnecting tube 34. The control of the pressurized fluid flow to the tangential control jets 28 is derived from the electrohydraulic servo valve 33 situated adjacent to the shock strut. The controlled pressure fluid flow from the servo valve 33, passes through tube 35 and enters an annular distribution manifold 36 and is ejected tangentially from nozzles or jets 28 into the vortex chamber 27 thereby acting to impart a swirling motion to the main fluid through-flow. The through-flow enters the vortex chamber 27 through an annular series of ports 21 and exits from the vortex chamber through the central exit 22 of the vortex valve into chamber 23. The faster the fluid moves through the tangential control jets 28, the more swirling action is imparted to the main fluid flow through the vortex valve thereby increasing the impedance to the flow into chamber 23 and its exit through port 25 to the chamber 26 in the outer cylinder 11.

FIG. 3 schematically shows how the input signal to the servo valve 33 is derived. The vertical acceleration rate of the aircraft is determined by the computer 37 utilizing the inputs of the sink speed 39 and the airplane gross weight 40. At the instant of touch-down the computed signal corresponding to the vertical acceleration level designed for the shock absorption is fed into a summer 41 and then into the servo valve 33. The servo valve 33 controls the pressurized fluid flow from the high pressure section or chamber 16 of the differential piston 14, from the high pressure supply line 34, to the vortex valve 20 and tangential control jets 28 through the interconnecting line 35 or the vortex valve fluid pressure control line. The servo valve 33 therefore controls the pressurized fluid flow to the vortex valve 20 based on inputs of airplane sink speed 39, gross weight 40 and vertical deceleration rate. The control flow into the tangential control jets 28, controls the restriction characteristics of the vortex valve 20 for passage of the fluid from the inner cylinder chamber 12 into the outer cylinder chamber 26 thereby producing the desired damping characteristics. As the aircraft touches down and the fluid in chamber 12 is compressed, the degree of compression or pressure rise in chamber 12 is limited by the impedance to fluid flow caused by the vortex valve 20. The pressurized fluid from chamber 12 is forced through the tube 30 and into chamber 19 and acts against the larger of the two pistons of the differential piston 14. This in turn creates the higher pressure in chamber 16 which is transmitted to the servo valve 33 through the line 34. The fluid volume between the pistons of the differential piston 14 is vented through ports 42 to chamber 26 which is at a lower pressure than that of chamber 12 because of the pressure drop in the variable impedance assembly 13. The flow of pressurized fluid from the servo valve 33 through the tube 35 to the tangential control jets 28 of the vortex valve 20, increases the impedance of the vortex valve which in turn increases the pressure drop across the vortex valve assembly and produces the desired aircraft sink speed by controlling the compressive strut fluid flow rate. An increase in pressure drop across the vortex valve assembly produces an increased force on the strut piston and thus reduces the airplane sink speed at an increased rate. This rate increase is picked up by a vertical acceleration transducer 43 attached to aircraft structure and its output is compared at the summer 41 with the original desired level of deceleration. Any discrepancy is therefore the servo error signal which corrects the servo valve output flow. The strut function as described results in strut load carrying ability being varied in a way which decelerates the airplane mass vertical motion at the rate best suited for the prevailing landing conditions, producing minimum structural loads and passenger discomfort. Such operation requires that the force or loading of the strut be nominally constant in spite of the changing rate of strut length change. The force is directly proportional to deceleration so that the strut should function to achieve constant deceleration. Any variation in deceleration is sensed by the acceleration transducer 43. The variation is detected at the summer 41, generating a signal to the servo valve 33, which in turn controls the vortex valve 20 to change the strut force to maintain the desired influence on the airplane dynamics 44 as sensed by the acceleration transducer 43.

As the aircraft takes off and the wheels leave the runway, the inner cylinder 12 is pushed outward from the cylinder 11 or extended downward as the now higher pressure air in the strut chamber 26 expands and forces the fluid from chamber 26 through ports 25 into chamber 23 and through the vortex valve 20 into chamber 12. This same pressure will force fluid through the one-way ball check valve 32 into chamber 16 and move the differential piston 14 back toward the vortex valve 20 to return it to its initial position with the volume in chamber 19 reduced to a minimum as the fluid from chamber 19 returns to chamber 12 through tube 30. This action resets the shock strut for the next shock absorption function or landing.

What is claimed is:

1. A fluid damped shock absorber comprising: an outer cylinder; an inner cylinder slidably mounted in the outer cylinder; variable fluid impedance means interposed between the outer and inner cylinders for controlling the main fluid through flow between the interiors of the outer and inner cylinders; said variable fluid impedance means including a vortex valve having an annular chamber provided with tangential nozzles for injecting high pressure fluid tangentially into the chamber to create a vortex flow in the annular chamber thereby impeding the main fluid through-flow; and said variable fluid impedance means further including means for varying the rate of high pressure fluid flow to the tangential nozzles and thereby varying the impedance to the main fluid through-flow.

2. The fluid damped shock absorber set forth in claim 1 further including a fluid pressure multiplier means housed within the shock absorber and actuated by the compression of the landing gear shock strut during touch-down for generating a high pressure fluid for injection through the vortex nozzles.

3. The fluid damped shock absorber set forth in claim 1 wherein said means for varying the rate of pressure fluid flow to the tangential nozzles comprises a servo valve.

4. The fluid damped shock absorber set forth in claim 3 further including an automatic sensing system for determining the aircraft's vertical deceleration rate during landing touch-down and directly controlling the servo valve in response thereto.

5. In a fluid damped shock absorber comprising, an outer cylinder and an inner cylinder relatively movable within the outer cylinder; a variable fluid impedance means interposed between the outer and inner cylinders for controlling the main fluid through-flow between the interiors of the outer and inner cylinders and fixedly located with respect to said outer cylinder; said variable fluid impedance means comprising: a vortex valve having an annular chamber provided with tangential nozzles for injecting high pressure fluid tangentially into the chamber to create a vortex flow in the annular chamber thereby impeding the main fluid through-flow; and means for varying the rate of high pressure fluid flow to the tangential nozzles to thereby vary the impedance to the main fluid through-flow.

6. A fluid damped linear shock absorber for an aircraft landing gear strut comprising: an outer cylinder having a closed end forming a first chamber; an inner cylinder axially movable within the outer cylinder having a closed end outermost from the closed end of the outer cylinder and forming a second chamber; a fluidic vortex valve interposed between the first and second chambers for controlling the fluid flow from one chamber to the other; said vortex valve having an annular chamber with a central opening; nozzles mounted in the periphery of the chamber for injecting fluid tangentially into the chamber to impart a swirling motion to the main fluid through-flow thereby impeding its exit from the central opening of the vortex valve; and a servo valve connected to the shock strut for controlling the fluid injected through the nozzles and thereby controlling the restriction characteristics of the vortex valve for passage of fluid from the second chamber into the first chamber to produce the desired aircraft damping by controlling the compressive strut fluid flow rate.

7. A landing gear shock strut mechanism for controlling the rate of vertical deceleration of an aircraft at touchdown, comprising: an outer cylinder having a closed end forming a first chamber; an inner cylinder axially movable within the outer cylinder having a closed end outermost from the closed end of the outer cylinder and forming a second chamber; a fluidic vortex valve fixedly attached to the interior of the outer cylinder and interposed between the first and second chambers for controlling the rate of fluid flow from one chamber to the other; said vortex valve having a cylindrical flow chamber with an annular series of ports and a central orifice; nozzles mounted in the periphery of the chamber for injecting fluid tangentially into the chamber to impart a swirling motion to the main fluid through-flow entering through the annular series of ports thereby impeding its exit from the central orifice of the vortex valve when the inner cylinder is pushed into the outer cylinder as the landing gear shock strut is compressed; and a servo valve mounted adjacent to the shock strut for controlling the force of the fluid injected through the nozzles and thereby controlling the strength of the swirling action of the main fluid through-flow for varying the impedance of damping fluid through the orifice.

8. The fluid damped shock absorber set forth in claim 7 further including means responsive to the vertical acceleration of an aircraft during landing touch-down for directly varying the input signal to the servo valve and thereby varying the fluid flow to the tangential nozzles of the vortex valve.

* * * * *